United States Patent
Stratmann et al.

(10) Patent No.: US 11,498,380 B2
(45) Date of Patent: Nov. 15, 2022

(54) ARRANGEMENT OF AN ANGLE MEASUREMENT DEVICE

(71) Applicant: ZF Friedrichshafen AG, Friedrichshafen (DE)

(72) Inventors: Julian Stratmann, Melle (DE); Florian Bäumer, Westerkappeln (DE); Josef Holtheide, Neuenkirchen (DE); Felix Kallaß, Osnabrück (DE); Thorsten Sander, Rahden (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 377 days.

(21) Appl. No.: 16/626,367

(22) PCT Filed: Jun. 6, 2018

(86) PCT No.: PCT/EP2018/064818
§ 371 (c)(1),
(2) Date: Dec. 24, 2019

(87) PCT Pub. No.: WO2019/007613
PCT Pub. Date: Jan. 10, 2019

(65) Prior Publication Data
US 2020/0114717 A1    Apr. 16, 2020

(30) Foreign Application Priority Data
Jul. 4, 2017    (DE) .................... 10 2017 211 396.0

(51) Int. Cl.
*B60G 7/00* (2006.01)
*F16C 11/06* (2006.01)
*F16C 41/00* (2006.01)

(52) U.S. Cl.
CPC .......... *B60G 7/005* (2013.01); *F16C 11/0614* (2013.01); *F16C 41/007* (2013.01);
(Continued)

(58) Field of Classification Search
CPC ............. B60G 7/005; B60G 2204/416; B60G 2204/1162; B60G 2400/05162; F16C 11/0614; F16C 41/007
(Continued)

(56) References Cited

U.S. PATENT DOCUMENTS 7,045,999 B2    5/2006  Ersoy et al.
7,170,285 B2 *  1/2007  Spratte ................. F16C 41/007
                                                        324/207.21
(Continued)

FOREIGN PATENT DOCUMENTS

DE    102 21 873 A1    11/2003
DE    103 43 588 A1     4/2005
(Continued)

OTHER PUBLICATIONS

English Translation of JP2005292070, Tsurita, retrieved from Espacenet on Apr. 12, 2022 (Year: 2004).*
(Continued)

*Primary Examiner* — Paul N Dickson
*Assistant Examiner* — Caitlin Anne Miller
(74) *Attorney, Agent, or Firm* — Finch & Maloney PLLC

(57) ABSTRACT

An arrangement of an angle measurement device on the chassis of a vehicle. The chassis includes a control arm (1) and a pivot bearing (2) with a pivot axis. The control arm (1) pivots about the pivot axis and the angle measurement device has a sensor (3) and a signal emitter. The sensor (3) is arranged on the control arm (1), in the area of the pivot axis, and the signal emitter is arranged on the pivot bearing (2).

12 Claims, 4 Drawing Sheets

(52) U.S. Cl.
CPC ..... *B60G 2204/1162* (2013.01); *B60G 2204/416* (2013.01); *B60G 2400/05162* (2013.01)

(58) Field of Classification Search
USPC .................................................. 324/207.25
See application file for complete search history.

(56) References Cited

U.S. PATENT DOCUMENTS

| | | | | |
|---|---|---|---|---|
| 7,405,557 | B2* | 7/2008 | Spratte | B60G 17/015 |
| | | | | 324/261 |
| 7,652,470 | B2* | 1/2010 | Spratte | F16C 11/0614 |
| | | | | 324/207.21 |
| 7,766,354 | B2 | 8/2010 | Ersoy et al. | |
| 8,179,128 | B2 | 5/2012 | Klank et al. | |
| 11,192,417 | B2* | 12/2021 | Stratmann | F16C 11/10 |
| 2004/0190805 | A1* | 9/2004 | Ersoy | B60Q 1/115 |
| | | | | 384/448 |
| 2005/0121219 | A1* | 6/2005 | Pohl | F16F 1/3835 |
| | | | | 174/650 |
| 2006/0220285 | A1* | 10/2006 | Urquidi | B60G 7/02 |
| | | | | 267/140.15 |
| 2008/0174083 | A1* | 7/2008 | Ersoy | B60G 3/20 |
| | | | | 280/124.138 |
| 2009/0016811 | A1* | 1/2009 | Spratte | G01D 5/145 |
| | | | | 403/163 |
| 2010/0013173 | A1* | 1/2010 | Klank | B60G 17/019 |
| | | | | 280/5.506 |
| 2011/0153157 | A1* | 6/2011 | Klank | B60G 7/005 |
| | | | | 701/37 |
| 2020/0139777 | A1* | 5/2020 | Holtheide | F16C 11/0661 |

FOREIGN PATENT DOCUMENTS

| | | |
|---|---|---|
| DE | 103 58 763 A1 | 7/2005 |
| DE | 10 2005 012 245 A1 | 9/2006 |
| DE | 10 2006 061 976 A1 | 7/2008 |
| DE | 102019201521 A1 * | 8/2020 |
| DE | 102020206204 A1 * | 11/2021 |
| FR | 2 973 292 A1 | 10/2012 |
| JP | 2005-292070 A | 10/2005 |
| WO | 2017/215838 A1 | 12/2014 |
| WO | WO-2021078459 A1 * | 4/2021 ........... B60G 17/019 |

OTHER PUBLICATIONS

International Search Report Corresponding to PCT/EP2018/064818 dated Aug. 29, 2018.
Written Opinion Corresponding to PCT/EP2018/064818 dated Aug. 29, 2018.

* cited by examiner

ARRANGEMENT OF AN ANGLE MEASUREMENT DEVICE

This application is a National Stage completion of PCT/EP2018/064818 filed Jun. 6, 2018, which claims priority from German patent application serial no. 10 2017 211 396.0 filed Jul. 4, 2017.

FIELD OF THE INVENTION

The invention relates to an arrangement of an angle measurement device on the chassis of a motor vehicle.

BACKGROUND OF THE INVENTION

From DE 10 2006 061 976 A1 by the present applicant a wheel suspension for a vehicle has become known, wherein a control arm is attached to and able to pivot on the body of the vehicle by means of a bearing. On the wheel suspension, also called the chassis in what follows, an angle measurement device is provided by means of which pivoting movement of the control arm about the pivot axis of the bearing relative to the body can be detected. The angle measurement device has two components, a sensor and a signal emitter, these preferably being in the form of a magnetic sensor and a magnet. In a preferred embodiment the magnet is arranged externally on the control arm in the area of the pivot axis and the magnetic sensor is arranged in a special holder attached to the vehicle, in such manner that the magnet and the magnetic sensor are functionally connected with one another.

SUMMARY OF THE INVENTION

An objective of the present invention is to provide an improved arrangement of an angle measurement device, in particular a sensor and a signal emitter, on chassis components that can pivot relative to one another.

The invention embodies the characteristics specified in the independent claim(s). Advantageous design features emerge from the subordinate claims.

According to the invention, it is provided that the sensor is arranged on the control arm in the area of the pivot axis and the signal emitter is arranged on the pivot bearing. The control arm and the pivot bearing can move relative to one another about the at least one pivot axis and can therefore adopt various angular positions relative to one another. The angular position in each case is detected by virtue of the co-operation of the signal emitter and the sensor. Compared with the prior art mentioned at the beginning, the advantage is obtained that no additional holding means are required for the attachment of the sensor, since the sensor is arranged directly on the control arm in the area of the pivot axis. By virtue of the arrangement of the sensor in accordance with the invention, the further advantage is obtained that the sensor, which is preferably in a sensor housing, is protected against damaging environmental influences. The pivot axis can be located on a wheel side, for example on a wheel carrier, or on the vehicle side, for example on an auxiliary frame or a rear axle. In either case the angular movement and the angular position of the control arm relative to the wheel carrier or the vehicle are detected.

According to a preferred embodiment, on the bearing side the control arm has an annular eye with a receiving opening in which the pivot bearing, for example a rubber bearing, is held.

In a further preferred embodiment, the annular eye has an outer surface on which the sensor is arranged and fixed. Thus, in the radial direction the sensor is arranged outside the signal emitter and is separated from the signal emitter by the wall thickness of the annular eye.

According to a further preferred embodiment, in the outer surface a recess in the form of a depression is formed, so that the sensor on the control arm is guided preferably in the tangential direction. The sensor is fixed onto the control arm, which can be done by a form-enclosing engagement of the sensor housing with the control arm or by additional attachments means, for example a screw joint. The recess preferably has two parallel guiding surfaces and a stop surface at the end. The third side is open, so that the sensor can be inserted into the recess and fixed therein. Advantageous in this arrangement is the relatively small distance between the sensor and the signal emitter, so that the magnetic field of the signal emitter reaches the sensor without weakening or interference.

In another preferred embodiment the pivot bearing is a spherical sleeve joint with a sleeve that has a spherical portion. The receiving opening of the control arm eye is in the form of a spherical cup and can therefore accommodate the spherical part of the sleeve. The control arm can thus not only undergo pivoting movement about the pivot axis, i.e. the longitudinal axis of the spherical sleeve, but also pivoting movements about axes perpendicular to the longitudinal axis (transverse axes). Furthermore, another advantage is that the spherical portion makes available additional structural space for fitting the signal emitter.

According to a further preferred embodiment, the signal emitter is arranged in the spherical portion of the sleeve. By virtue of this arrangement the signal emitter is protected against damaging influences of the immediate surroundings.

In a further preferred embodiment, the signal emitter is in the form of a permanent magnet. Without having to provide energy from outside, the permanent magnet produces a magnetic field which is functionally connected with the sensor arranged radially on the outside.

According to another preferred embodiment, the sensor is a magnetically sensitive sensor, in particular a Hall sensor. Hall sensors are commercially available structural elements which react to any change of the magnetic field by producing a signal. The magnetic field change is brought about by relative movement between the signal emitter, namely the magnet, and the sensor, namely the Hall sensor.

In a further preferred embodiment the permanent magnet is in the form of a cylinder with a cylinder axis which extends in the radial direction relative to the pivot axis. Thus, the North and South poles of the cylindrical magnet are orientated radially. The magnetically sensitive sensor, also called the magnetic sensor for short, is arranged radially relative to the pivot axis and outside the cylindrical magnet. When fitting the magnet, or the pivot axis of the spherical sleeve joint, an adjustment between the magnet and the sensor has to be carried out so that during operation the magnet will remain in the magnetically sensitive or "visible" range of the sensor.

According to a further preferred embodiment, the signal emitter can be in the form of a ring magnet, i.e. an annular magnet located in an annular groove of the spherical sleeve. The ring magnet is preferably made as a magnet wheel such as that described in DE 103 58 763 A1 by the present applicant. The magnet wheel has a plurality of radially magnetized zones such that adjacent zones in each case have oppositely orientated magnetization directions—so that as viewed in the circumferential direction a North pole always follow a South pole. Consequently, the signal emitter in the form of a ring magnet is within range of the sensor in any angular position. In this case no adjustment and/or fixing of the ring magnet in the circumferential direction relative to the sensor is needed. In particular, it is not necessary to orientate the ring magnet as the signal emitter relative to the sensor during assembly.

According to a further preferred embodiment, the signal emitter is formed by a plurality of individual cylindrical magnets orientated radially relative to their cylinder axis, which are distributed around the circumference. In this case too, no adjustment and/or orientation between the signal emitter and the sensor is needed, in particular during assembly.

BRIEF DESCRIPTION OF THE DRAWINGS

Example embodiments of the invention are illustrated in the drawings and will be described in greater detail in what follows, so that from the description and/or the drawings further features and/or advantages can emerge. The drawings show.

DETAILED DESCRIPTION OF THE PREFERRED EMBODIMENTS

Figure 1:
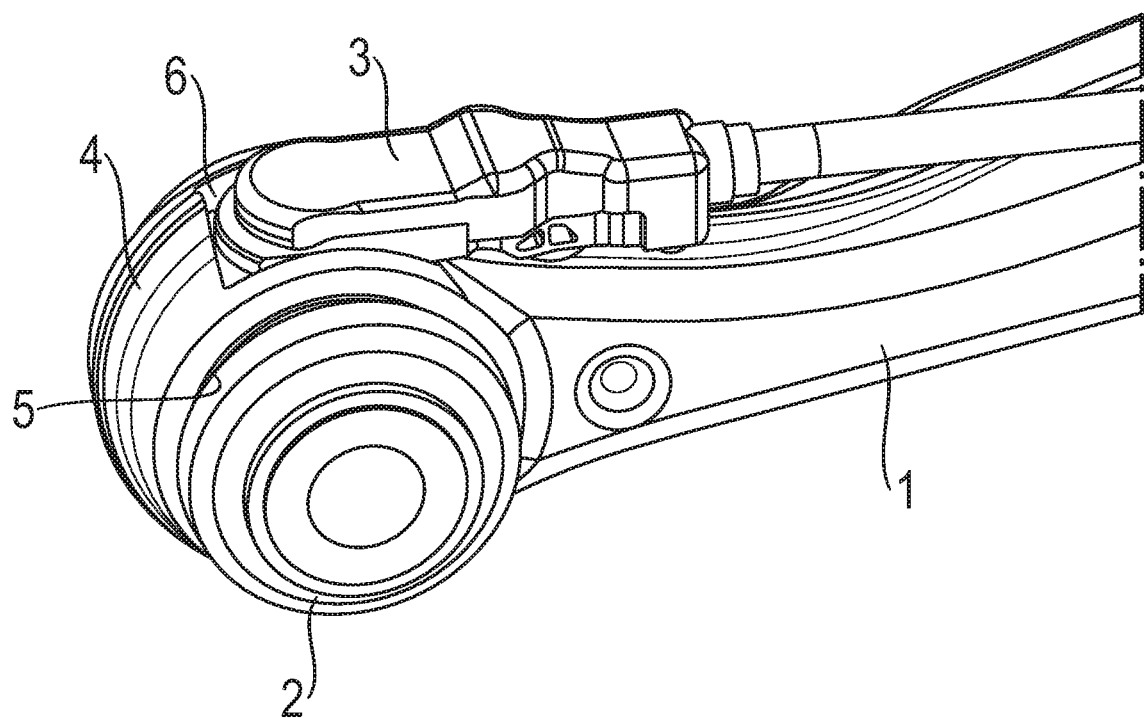
FIG. 1: A vehicle control arm (shown in part) with a sensor and a spherical sleeve joint.

FIG. 1 shows a 3D representation of a control arm 1 (seen in part) of a chassis of a motor vehicle, having a pivot bearing 2 in the form of a spherical sleeve joint 2 and a sensor 3. The control arm 1, preferably a transverse control arm 1, is part of a chassis or wheel suspension of a rear axle of a motor vehicle. According to a preferred embodiment, the control arm 1 is connected to a wheel carrier (not shown) by the spherical sleeve joint 2. The control arm 1 has an annular eye 4 with a receiving opening 5, in which the spherical sleeve joint 2 is held. In the outer circumference of the eye 4 is formed a recess 6, which accommodates the sensor 3.

Figure 2:
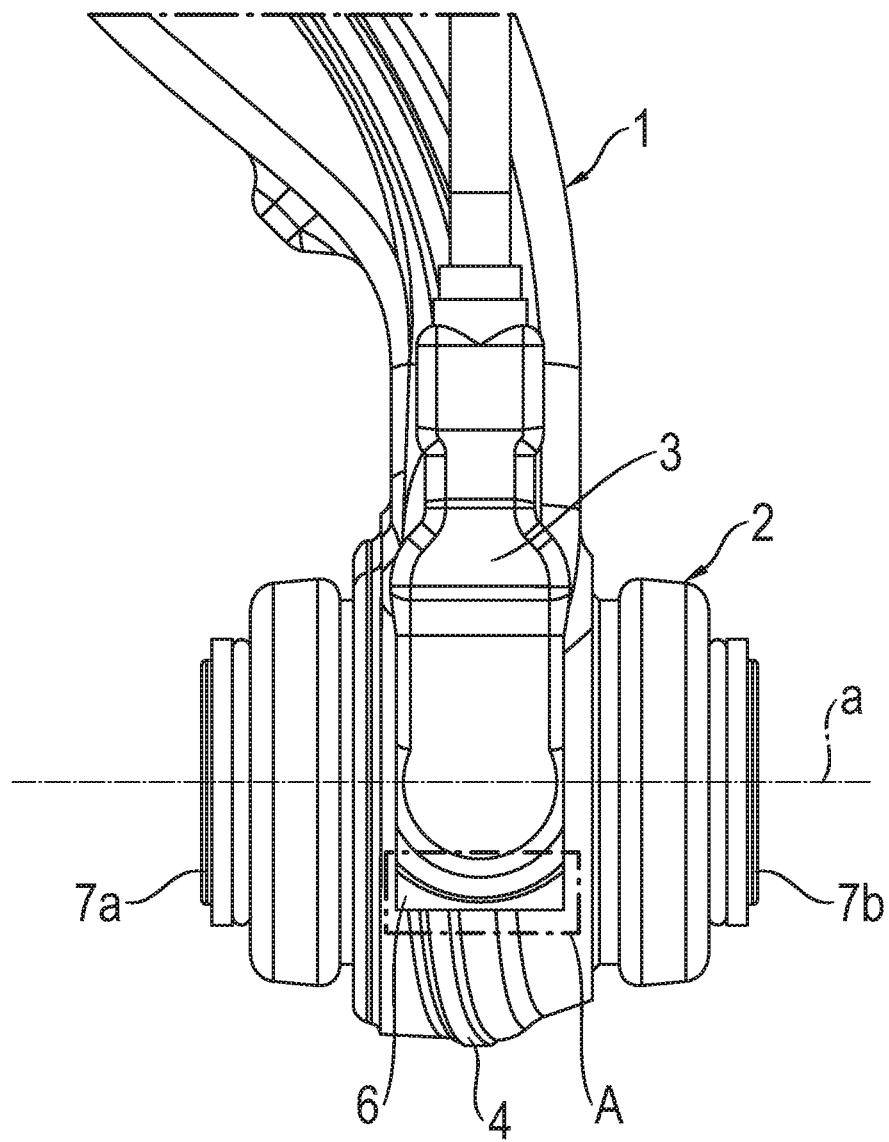
FIG. 2: A control arm as in FIG. 1, viewed from above.

FIG. 2 shows the control arm 1 viewed from above, from which the arrangement of the sensor 3 on the control arm 1 can be seen clearly. The axis of the spherical sleeve joint 2 is indexed a and will also be called the pivot axis a in what follows, because the control arm 1 predominantly undergoes a pivoting movement about the pivot axis a. Owing to the design of the pivot bearing as a spherical sleeve joint 2, however, pivoting movements about axes transverse to the longitudinal axis a are also possible. The spherical sleeve joint 2 comprises a spherical sleeve, which is only partially visible in FIG. 2, namely at its ends 7a, 7b that project outward beyond the width of the control arm eye 4. The spherical sleeve is at its two ends 7a, 7b held between bearing blocks (not shown) of the wheel carrier. As can be recognized in the view from above, the recess 6 is matched to the shape of the sensor 3, so that the sensor is guided laterally and thereby also secured against rotation. The housing of the sensor 3 at one end, indicated by a rectangle A, can be secured against displacement in a direction transverse to the pivot axis a by suitable interlocking or frictional means.

Figure 3:
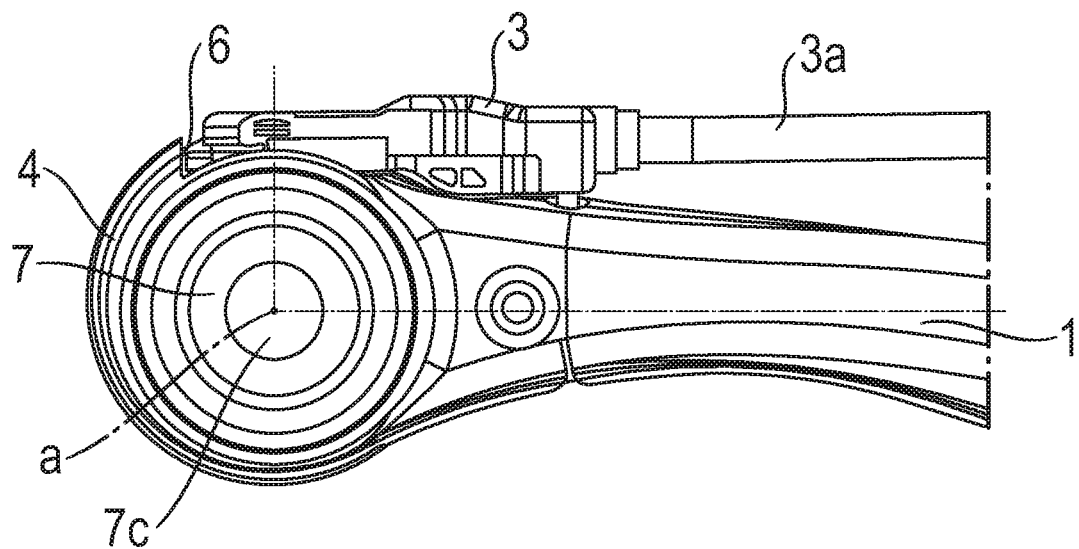
FIG. 3: The control arm, viewed from the side.

FIG. 3 shows the control arm 1 with the partially sectioned sensor 3 held in the recess 6, with its sensor cable 3a, viewed in the direction of the pivot axis a. The spherical sleeve 7, represented as a circular cross-section, has a through-hole 7c through which the spherical sleeve joint 2 is connected to the wheel carrier by a bolt (not shown). In that way the spherical sleeve 7 is fixed to the wheel carrier.

Figure 4:
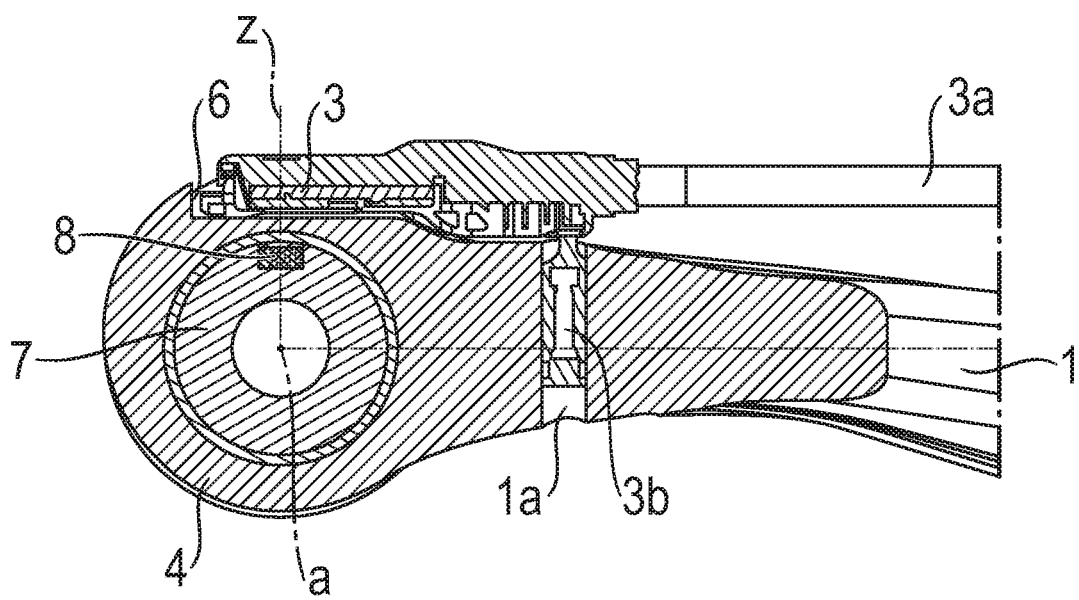
FIG. 4: A radial section through the spherical sleeve joint, with a magnet and a sensor.

FIG. 4 shows a sectioned representation of the control arm 1, i.e. a radial section perpendicular to the pivot axis a. It can be seen that the underside of the sensor 3 or its housing lies flat along the bottom of the recess 6, which is in the form of a depression relative to the outer circumference of the control arm eye 4. The sensor, which is connected by way of the cable 3a to an electronic evaluation unit (not shown), has a so-termed sensor dome 3b in the form of a projecting pin, which is accommodated in a first bore 1a of the control arm 1 and thus secures the sensor 3 against rotation. However, this can optionally be omitted because of the above-mentioned guiding function of the recess 6. In the spherical sleeve 7 there is arranged a signal emitter 8 in the form of a cylindrical magnet 8, which is positioned radially inside the sensor 3 so that there is a relatively small distance between the signal emitter 8 and the sensor 3, which is in the form of a magnetically sensitive sensor 3 or magnetic sensor 3 for short, and which in accordance with a preferred embodiment is a Hall sensor 3. The poles of the magnet 8 are located on a cylinder axis z which is orientated radially. The magnet 8 is preferably a permanent magnet and produces a magnetic field, whose field lines are essentially directed radially and are in functional connection with the magnetic sensor 3. When a field change takes place, caused by a relative movement between the control arm 1 and the spherical sleeve 7, a signal is generated. During the assembly of the spherical sleeve joint 2, particularly that of the spherical sleeve 7 with the magnet 8 (the only one at the circumference), it must be ensured by adjustment that the magnet 8 is "within range" of the sensor 3.

Figure 5:
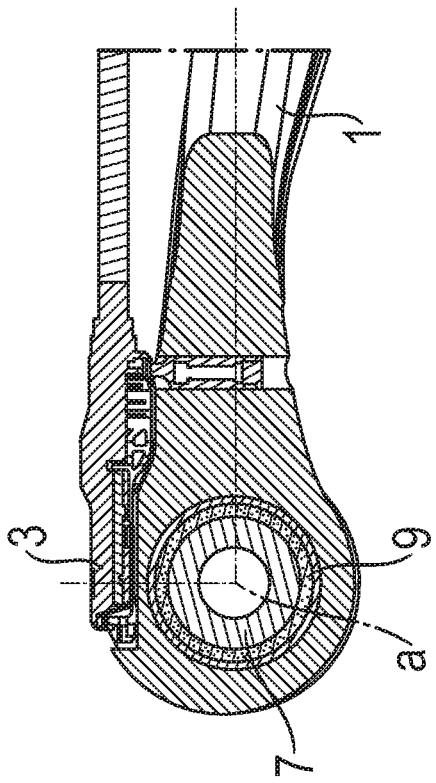
FIG. 5: A further embodiment of the invention, with a ring magnet.

FIG. 5 shows a second example embodiment of the invention, which corresponds in large measure to the previous example embodiment so that the same indexes are used to denote the same components. Instead of the cylindrical permanent magnet 8 (FIG. 4), in this case a ring magnet 9 is provided which is arranged coaxially with the spherical sleeve axis a in the spherical sleeve 7. The magnetic field of the ring magnet 9 is in functional connection with the sensor 3 in such manner that a relative movement between the ring magnet 9 and the sensor 3 results in the emission of a signal. Preferably, the ring magnet is in the form of a magnet wheel such as that known, for example, from DE 103 58 763 A1 by the present applicant. In this, around the circumference differently magnetized zones with opposite orientations are provided.

Figure 6:
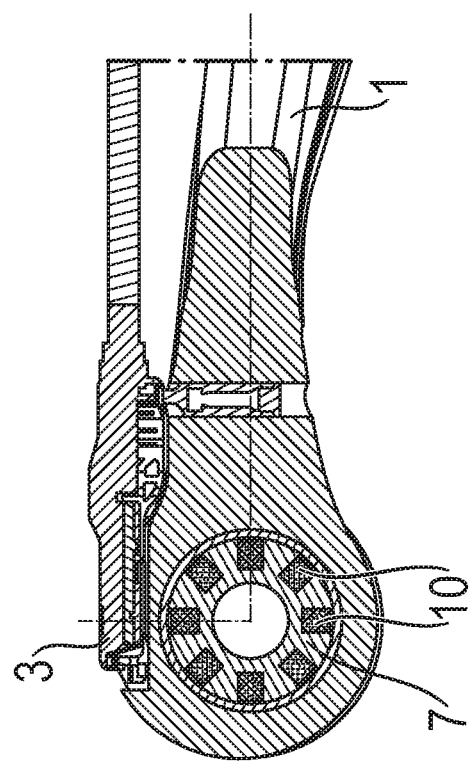
FIG. 6: A further embodiment of the invention, with cylindrical magnets distributed around the circumference.

FIG. 6 shows a third example embodiment of the invention, which differs from the previous one in the structure of the signal emitter: a plurality of cylindrical magnets 10 (in the drawing there are eight, in each case offset by 45 degrees), uniformly distributed around the circumference, are arranged in the spherical sleeve 7, the axes of the cylinders being orientated radially. The magnetic fields emanating from the magnets 10 are functionally connected with the sensor 3.

In the second and third example embodiments no adjustment during assembly is required as it was with the first example embodiment, since in any angular position between the spherical sleeve 7 and the sensor 3 there is a functional connection between the ring magnet 9 (FIG. 5) or cylindrical magnets 10 (FIG. 6) and the sensor 3.

INDEXES

1 Control arm
1a Bore
2 Spherical sleeve joint
3 Sensor
3a Sensor cable
3b Sensor dome
4 Eye
5 Receiving opening
6 Recess
7 Spherical sleeve
7a End surface
7b End surface
8 Signal emitter/magnet
9 Ring magnet
10 Cylindrical magnet
A Rectangle
a Pivot axis
z Cylinder axis of the magnet 8

The invention claimed is:

1. An arrangement of an angle measurement device on a chassis of a vehicle, the chassis having a control arm and a pivot bearing with a pivot axis,
   the control arm being pivotable about the pivot axis, the control arm having a recess that extends perpendicular to the pivot axis, and the recess has axially opposite sides,
   the angle measurement device having a sensor and a signal emitter,
   the sensor being arranged, on the control arm, in an area of the pivot axis, the sensor being fixed within the recess between the axially opposite sides of the recess, and
   the signal emitter being arranged on the pivot bearing.

2. The arrangement according to claim 1, wherein the control arm has, on a bearing side, an annular eye with a receiving opening for the pivot bearing.

3. The arrangement according to claim 2, wherein the eye has an outer surface, and the recess being a depression within the outer surface, and the axially opposite sides of the recess being parallel guiding surfaces, and the sensor is arranged within the recess and fixed to the outer surface.

4. The arrangement according to claim 3, wherein the recess further has an open side in which the sensor is inserted into the recess and is guided laterally between the guiding surfaces and held.

5. The arrangement according claim 1, wherein the pivot bearing is in a form of a spherical sleeve joint with a sleeve having a spherical portion.

6. The arrangement according to claim 5, wherein the signal emitter is accommodated in the spherical portion of the sleeve.

7. The arrangement according to claim 5, wherein the signal emitter consists of a plurality of permanent magnets that are arranged in the sleeve and spaced from each other around a circumference of the pivot bearing.

8. The arrangement according to claim 1, wherein the signal emitter is in a form of a permanent magnet.

9. The arrangement according to claim 8, wherein the permanent magnet is in a form of a cylinder with a cylinder axis, which is arranged in a radial direction relative to the pivot axis.

10. The arrangement according to claim 8, wherein the signal emitter is in a form of a ring magnet.

11. The arrangement according to claim 1, wherein the sensor is a Hall sensor.

12. An arrangement of an angle measurement device on a chassis of a vehicle, the arrangement comprising:
   a control arm of the chassis having an annular eye with a receiving opening receiving a pivot bearing, the pivot bearing defining a pivot axis about which the control arm is pivotable relative to the pivot bearing, the annular eye having a radially outer surface with a recess formed therein, the recess having axially opposite guiding surfaces that extend perpendicular to the pivot axis; and
   the angle measurement device having a sensor and a signal emitter, the sensor being fixed axially within the recess between the guiding surfaces and the signal emitter being arranged in a radially outer surface of the pivot bearing, and the sensor detecting signals emitted by the signal emitter to facilitate measuring movement of the control arm relative to the pivot bearing.

* * * * *